(12) United States Patent
Kawamoto

(10) Patent No.: US 9,409,548 B2
(45) Date of Patent: Aug. 9, 2016

(54) DETECTION DEVICE FOR VEHICLE, ABNORMALITY DETECTION METHOD, AND ABNORMALITY DETECTION PROGRAM

(71) Applicant: SUMITOMO ELECTRIC INDUSTRIES, LTD., Osaka-shi, Osaka (JP)

(72) Inventor: Koji Kawamoto, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 136 days.

(21) Appl. No.: 14/343,967

(22) PCT Filed: Sep. 28, 2012

(86) PCT No.: PCT/JP2012/075038
§ 371 (c)(1),
(2) Date: Mar. 10, 2014

(87) PCT Pub. No.: WO2013/047727
PCT Pub. Date: Apr. 4, 2013

(65) Prior Publication Data
US 2014/0218186 A1 Aug. 7, 2014

(30) Foreign Application Priority Data

Sep. 28, 2011 (JP) .................................. 2011-212059

(51) Int. Cl.
*B60R 25/10* (2013.01)
*G01S 13/04* (2006.01)
(Continued)

(52) U.S. Cl.
CPC ................. *B60R 25/10* (2013.01); *G01S 13/04* (2013.01); *G01S 13/886* (2013.01); *G08B 13/187* (2013.01); *G08B 29/185* (2013.01); *G08B 13/19695* (2013.01)

(58) Field of Classification Search
CPC ....................................................... B60R 25/10

USPC ............................. 340/426.1, 426.24, 426.26
See application file for complete search history.

(56) References Cited

U.S. PATENT DOCUMENTS 6,194,997 B1 * 2/2001 Buchner .................. 340/426.26
2005/0099271 A1 * 5/2005 Sasaki ........................ 340/426.1
(Continued)

FOREIGN PATENT DOCUMENTS

CN 101669149 A 3/2010
JP H02-164988 A 6/1990
(Continued)

OTHER PUBLICATIONS

Jihoon Hong, et al., "State Classification based on Signal Subspace using Support Vector Machine for Wireless Monitoring," IEICE Technical Report, RCS2010-72 (Jul. 2010), pp. 143-148, including English Abstract.

(Continued)

Primary Examiner — Brent Swarthout
(74) Attorney, Agent, or Firm — Drinker Biddle & Reath LLP

(57) ABSTRACT

The present invention relates to a detection device 100 for a vehicle, which can prevent damage to the vehicle by detecting occurrence of abnormality before the vehicle is damaged, and can accurately detect abnormality inside and outside the vehicle. The detection device 100 for a vehicle of the present invention includes: a transmission antenna 1, installed inside a vehicle 50, for transmitting a radio wave; reception antennae 2, 3, 4, and 5, installed inside the vehicle 50, for receiving the radio wave; and an abnormality detection calculation section 6 that calculates a spatial feature amount P(t) based on the radio wave received by each of the reception antennae 2, 3, 4, and 5, and detects, based on the calculated spatial feature amount P(t), a motion of a person outside the vehicle 50 and a motion of a person intruding into the vehicle 50.

17 Claims, 8 Drawing Sheets

(51) Int. Cl.
*G08B 13/187* (2006.01)
*G01S 13/88* (2006.01)
*G08B 29/18* (2006.01)
*G08B 13/196* (2006.01)

(56) References Cited

U.S. PATENT DOCUMENTS

2009/0051511 A1* 2/2009 Tanaka ................ 340/426.1
2010/0164780 A1 7/2010 Ohtsuki et al.

FOREIGN PATENT DOCUMENTS

| JP | H11-334536 A | 12/1999 |
|---|---|---|
| JP | 2003-258519 A | 9/2003 |
| JP | 2007-132119 A | 5/2007 |
| JP | 2008-216152 A | 9/2008 |
| WO | WO 2008/131813 A1 | 11/2008 |

OTHER PUBLICATIONS

Keiji Terasaka, et al., "Study on Indoor Human Body Detection Using UWB-IR," The Transactions of the Institute of Electronics, Information and Communication Engineers B, vol. J90-B, No. 1, Jan. 1, 2007, pp. 97-100, including partial English translation.

"Nissan Genuine Security System", [online], [Searched on Aug. 10, 2011], Internet <URL: http://www.nissan.co.jp/OPTIONAL-PARTS/SECURITY/security01.html>, including partial English translation.

* cited by examiner

DETECTION DEVICE FOR VEHICLE, ABNORMALITY DETECTION METHOD, AND ABNORMALITY DETECTION PROGRAM

TECHNICAL FIELD

The present invention relates to a detection device for a vehicle, an abnormality detection method, and an abnormality detection program. More particularly, the invention relates to a detection device for a vehicle, an abnormality detection method, and an abnormality detection program, by which a motion of a person is detected by using a spatial feature amount.

BACKGROUND ART

An intrusion detection device has been developed which detects a motion of a person in a specific area such as indoors. As an example of an intrusion detection method, a method using a propagation delay profile, i.e., a power delay profile, of UWB-IR (Ultra WideBand-Impulse Radio) is disclosed in "Study on Indoor Human Body Detection Using UWB-IR", Keiji Terasaka et al., The Transactions of the Institute of Electronics, Information and Communication Engineers B, Vol. J90-B, No. 1, pp. 97 to 100, Jan. 1, 2007 (Non-Patent Literature 1), for example.

In the method disclosed in Non-Patent Literature 1, however, since a broadband signal is used, interference with other radio services becomes a problem. Further, since a power of a received signal is used, indoor multipath fading may occur, which may cause degradation of detection accuracy.

As a technique for resolving the above problems, Japanese Laid-Open Patent Publication No. 2008-216152 (Patent Literature 1) discloses a configuration as follows. That is, an event detection apparatus calculates an eigenvector, i.e., an arrival angle distribution, based on a signal received by an array antenna, and calculates an inner product of the calculated eigenvector and an eigenvector during normal time which is a comparison reference. Then, based on a result of comparison of the inner product with a predetermined threshold, the event detection apparatus detects occurrence of an event, i.e., an intruder:

Meanwhile, as an example of a detection device for a vehicle which detects a motion of a person and warns that abnormality occurs in the vehicle, there is disclosed a technique in which an ultrasonic sensor installed in a vehicle detects occurrence of abnormality in the vehicle such as a criminal's breaking glass and entering the vehicle and sounds a siren (Non-Patent Literature 2).

CITATION LIST

Non Patent Literature

NON PATENT LITERATURE 1: "Study on Indoor Human Body Detection Using UWB-IR", Keiji Terasaka et al., The Transactions of the Institute of Electronics, Information and Communication Engineers B, Vol. J90-B, No. 1, pp. 97 to 100, Jan. 1, 2007

NON PATENT LITERATURE 2: "Nissan Genuine Security System", [online], [Searched on Aug. 10, 2011], Internet <URL: http://www.nissan.co.jp/OPTIONAL-PARTS/SECURITY/security01.html>

Patent Literature

PATENT LITERATURE 1: Japanese Laid-Open Patent Publication No. 2008-216152

SUMMARY OF INVENTION

Technical Problem

In the technique disclosed in Non-Patent Literature 2, however, since an ultrasonic wave easy to attenuate in gas is used, a motion of a person outside a vehicle cannot be detected, and therefore, occurrence of abnormality cannot be detected until the vehicle is damaged.

The present invention is made to solve the above-mentioned problems, and it is an object of the present invention to provide a detection device for a vehicle, an abnormality detection method, and an abnormality detection program, which are capable of preventing damage to a vehicle by detecting occurrence of abnormality before the vehicle is damaged, and capable of accurately detecting abnormality inside and outside the vehicle.

Solution to Problem (1) In order to resolve the above-mentioned problems, a detection device for vehicle according to an aspect of the present invention includes: a transmission antenna, installed inside the vehicle, for transmitting a radio wave; a reception antenna, installed inside the vehicle, for receiving the radio wave; and an abnormality detection calculation section that calculates a spatial feature amount based on the radio wave received by the reception antenna, and detects, based on the calculated spatial feature amount, a motion of a person outside the vehicle and a motion of a person intruding into the vehicle.

According to the above configuration, damage to the vehicle can be prevented by detecting occurrence of abnormality before the vehicle is damaged, and abnormality inside and outside the vehicle can be accurately detected. For example, before a criminal commits a criminal act on the vehicle, approach of the criminal to the vehicle can be detected. Therefore, it is possible to prevent a crime by, for example, threatening the criminal before he/she commits a criminal act to let him/her give up such an act.

Further, for example, open/close of a door of the vehicle or breakage of window glass of the vehicle can be detected, and therefore, occurrence of abnormality on the vehicle can be speedily notified to an owner of the vehicle, a security company, or the like.

(2) More preferably, the detection device for a vehicle includes a plurality of the reception antennae, and the abnormality detection calculation section calculates a spatial feature amount based on the radio wave received by each of the reception antennae, and detects, based on the calculated spatial feature amounts, a direction in which a person approaches the vehicle.

According to the above configuration, in a case where three or more reception antennae are installed, the abnormality detection calculation section calculates a spatial feature amount for each of sets of two reception antennae, thereby detecting a motion of a person inside and outside the vehicle. Therefore, a reception area corresponding to a set of reception antennae can be identified as an area where a motion of a person is detected.

In a case where the transmission antenna transmits a radio wave having a bandwidth, such as an impulse response, the abnormality detection calculation section calculates a spatial feature amount for each of the radio waves received by the reception antennae, thereby detecting a motion of a person for each of the reception areas of the reception antennae.

(3) Preferably, the reception antennae are installed at a ceiling inside the vehicle.

According to the above configuration, the reception antennae can easily receive the radio wave coming from below. Therefore, even in a case where a person crouches down near the vehicle, the motion of the person can be accurately detected.

Further, in the case where the detection device for a vehicle includes a plurality of reception antennae, the plurality of reception antennae can be spaced at large intervals from each other without being significantly influenced by the layout inside the vehicle, thereby enhancing reception sensitivity.

In addition, since the reception antennae can be installed inside an interior trim part at the ceiling of the vehicle and wirings can be provided between a roof part and the interior trim part, the appearance of the interior of the vehicle is not deteriorated.

(4) More preferably, the transmission antenna is installed at the ceiling inside the vehicle.

According to the above configuration, the radio wave transmitted from the transmission antenna easily arrives at a lower area. Therefore, even in a case where a person crouches down near the vehicle 50, the motion of the person can be accurately detected.

In addition, since the transmission antenna can be installed inside the interior trim part at the ceiling of the vehicle and wirings can be provided between the roof part and the interior trim part, the appearance of the interior of the vehicle is not deteriorated.

(5) More preferably, the reception antennae are directional antennae.

According to the above configuration, when the directions of the directivities of the reception antennae are set toward the outside of the vehicle, the probability of the reception antennae receiving the radio wave reflected outside the vehicle can be increased.

(6) Preferably, the detection device for a vehicle includes four pieces of the reception antennae, and the four reception antennae are installed at a right front part, a right rear part, a left front part, and a left rear part of the vehicle, respectively.

Since the plurality of reception antennae are spaced at large intervals as described above, the periphery of the vehicle can be sectioned into the reception areas of the respective reception antennae. Further, by detecting a motion of a person in each of the reception areas, it is possible to more precisely identify an area where a motion of a person is detected around the vehicle.

(7) Preferably, the detection device for a vehicle includes four pieces of the reception antennae, and the four reception antennae are provided at a substantially center, in a left-right direction, of a front part of the vehicle, a substantially center, in the left-right direction, of a rear part of the vehicle, a substantially center, in a front-rear direction, of a right-side part of the vehicle, and a substantially center, in the front-rear direction, of a left-side part of the vehicle, respectively.

Since the plurality of reception antennae are spaced at large intervals as described above, the periphery of the vehicle can be sectioned into the reception areas of the respective reception antennae. Further, by detecting a motion of a person in each of the reception areas, it is possible to more precisely identify an area where a motion of a person is detected around the vehicle.

In addition, when a person approaches the vehicle from a frontward direction or a backward direction, the distance between the reception antenna installed at the front or rear of the vehicle and the approaching person is short, and therefore, the calculated spatial feature amount is large, which makes it easy to detect a motion of a person.

(8) More preferably, the abnormality detection calculation section, based on the calculated spatial feature amounts, determines a direction in which a motion of a person is detected, i.e., determines in which area a person is present among areas in front of, behind, to the right of, and to the left of the vehicle.

According to the above configuration, an area where a motion of a person is detected can be identified not only for a specific area such as an area near a driver's seat but also for an entire area around the vehicle.

(9) Preferably, the detection device for a vehicle further includes a warning section that performs warning by means of light when the abnormality detection calculation section detects the motion of the person.

According to the above configuration, only a person staring at the vehicle can be threatened, and therefore, it is possible to avoid an undesirable situation that a person just passing by the vehicle is threatened.

Preferably, when the abnormality detection calculation section detects a motion of a person, the warning section lights a warning lamp installed inside the vehicle at a position visible from the outside of the vehicle.

According to the above configuration, only a person who is interested in the inside of the vehicle can be threatened.

(10) Preferably, the detection device for a vehicle includes a warning section that controls lighting of a plurality of warning lamps that are installed at different positions in the vehicle and are visible from the outside of the vehicle. The warning section lights, among the plurality of warning lamps, a warning lamp corresponding to a reception antenna that receives a radio wave by which the abnormality detection calculation section detects the motion of the person.

According to the above configuration, only a person staring at the vehicle can be threatened, and therefore, it is possible to avoid an undesirable situation that a person just passing by the vehicle is threatened.

In addition, it is possible to enhance the threat to a suspicious person by causing the suspicious person to have a feeling of being watched.

(11) Preferably, the abnormality detection calculation section determines, based on a detected motion of a person, whether or not the person is a suspicious person, only in a case where reception of a specific radio wave is not detected in the detection device for a vehicle. That is, the abnormality detection calculation section does not determine, based on a detected motion of a person, whether or not the person is a suspicious person, in a case where reception of the specific radio wave is detected in the detection device for a vehicle.

The specific radio wave is, for example, a radio wave transmitted from a smart key owned by the driver of the vehicle. According to the above configuration, a person who should not be threatened, such as the driver of the vehicle, is prevented from being threatened.

(12) Preferably, the detection device for a vehicle further includes an illumination control section that controls lighting of an illumination of the vehicle. The illumination control section lights the illumination in a case where reception of a specific radio wave is detected in the detection device for a vehicle.

The specific radio wave is, for example, a radio wave transmitted from a smart key owned by the driver of the vehicle. According to the above configuration, it is possible to assist the driver of the vehicle to get in the vehicle by, for example, lighting the feet of the driver when the driver gets in the vehicle at night.

(13) Preferably, in a case where the abnormality detection calculation section continuously detects a motion of a person for a predetermined time period or more, the abnormality detection calculation section determines that the person is a suspicious person.

According to the above configuration, it is possible to distinguish a suspicious person from a person just passing by the vehicle, with the simple determination process.

(14) Preferably, in a case where the abnormality detection calculation section detects motions of a person successively with respect to a plurality of the reception antennae, the abnormality detection calculation section determines that the person is a suspicious person.

The "successively" means that the abnormality detection calculation section does not determine that a suspicious person is detected even when the abnormality detection calculation section simultaneously detects a motion of a person passing in front of the vehicle and a motion of another person passing behind the vehicle for example. That is, in a case where the abnormality detection calculation section recognizes a series of motions of a person such that the abnormality detection calculation section detects a motion of a person at the left side of the vehicle after detecting a motion of the same person behind the vehicle, and thereafter detects a motion of the same person in front of the vehicle, the abnormality detection calculation section determines that a suspicious person is detected.

According to the above configuration, distinction between a suspicious person and a person just passing by the vehicle can be performed with high accuracy.

(15) Preferably, the abnormality detection calculation section determines that a suspicious person is detected, in a case where the abnormality detection calculation section detects a motion of a person with respect to a second reception antenna after detecting a motion of the person with respect to a first reception antenna, among the plurality of reception antennae, and thereafter, again detects a motion of the person with respect to the first reception antenna.

As described above, by detecting a motion of a person who is wandering around the vehicle, distinction between a suspicious person and a person just passing by the vehicle can be performed with high accuracy.

(16) Preferably, in a case where the abnormality detection calculation section continuously detects a motion of a person for a predetermined time period or more with respect to the same reception antenna, the abnormality detection calculation section determines that the person is a suspicious person.

As described above, by detecting a motion of a person who stays in a specific area around the vehicle for the predetermined time period or more, distinction between a suspicious person and a person just passing by the vehicle can be performed with high accuracy.

(17) Preferably, the abnormality detection calculation section determines that there is a motion of a person outside the vehicle in a case where the calculated spatial feature amount is small, and determines that there is a motion of a person intruding into the vehicle in a case where the calculated spatial feature amount is large.

According to the above configuration, it is possible to distinguish a motion of a person approaching the vehicle from a motion of a person intruding into the vehicle. Further, by distinguishing a motion of a person approaching the vehicle from a motion of a person intruding into the vehicle, for example, the degree of risk of damage to the vehicle can be graded, and thereby threat to a suspicious person and notification to an owner, a security company, or the like can be changed in stages according to the degree of risk.

(18) In order to resolve the above-mentioned problems, an abnormality detection method according to an aspect of the present invention is an abnormality detection method used in a detection device for a vehicle, which includes a transmission antenna and a reception antenna installed inside the vehicle. The method includes the steps of: transmitting a radio wave from the transmission antenna; receiving the radio wave by the reception antenna; calculating a spatial feature amount based on the radio wave received by the reception antenna; and detecting a motion of a person outside the vehicle and a motion of a person intruding into the vehicle, based on the calculated spatial feature amount.

According to the above configuration, damage to the vehicle can be prevented by detecting occurrence of abnormality before the vehicle is damaged, and abnormality inside and outside the vehicle can be accurately detected. For example, before a criminal commits a criminal act on the vehicle, approach of the criminal to the vehicle can be detected. Therefore, it is possible to prevent a crime by, for example, threatening the criminal before he/she commits a criminal act to let him/her give up such an act.

(19) In order to resolve the above-mentioned problems, an abnormality detection program according to an aspect of the present invention is an abnormality detection program used in a detection device for a vehicle, which includes a transmission antenna and a reception antenna installed inside the vehicle. The abnormality detection program causes a computer to execute the steps of: transmitting a radio wave from the transmission antenna; receiving the radio wave by the reception antenna; calculating a spatial feature amount based on the radio wave received by the reception antenna; and detecting a motion of a person outside the vehicle and a motion of a person intruding into the vehicle, based on the calculated spatial feature amount.

According to the above configuration, damage to the vehicle can be prevented by detecting occurrence of abnormality before the vehicle is damaged, and abnormality inside and outside the vehicle can be accurately detected. For example, before a criminal commits a criminal act on the vehicle, approach of the criminal to the vehicle can be detected. Therefore, it is possible to prevent a crime by, for example, threatening the criminal before he/she commits a criminal act to let him/her give up such an act.

Advantageous Effects of Invention

According to the present invention, it is possible to prevent damage to a vehicle by detecting occurrence of abnormality before the vehicle is damaged, and to accurately detect abnormality inside and outside the vehicle.

DESCRIPTION OF EMBODIMENTS

[Configuration and Fundamental Operation]

Figure 1:
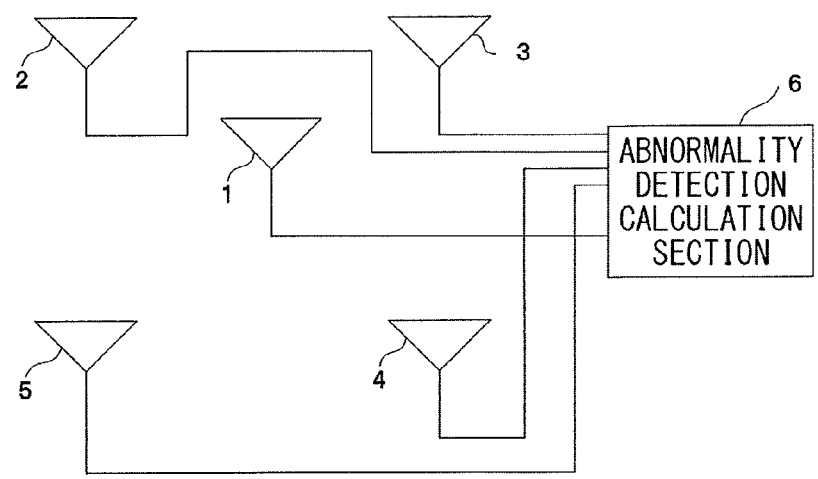
FIG. 1 is a block diagram showing a configuration of a detection device for a vehicle according to an embodiment of the present invention.

Hereinafter, an embodiment of the present invention will be described with reference to the drawings. In the drawings, the same or corresponding components are denoted by the same reference characters, and description thereof will not be repeated.

Figure 2:
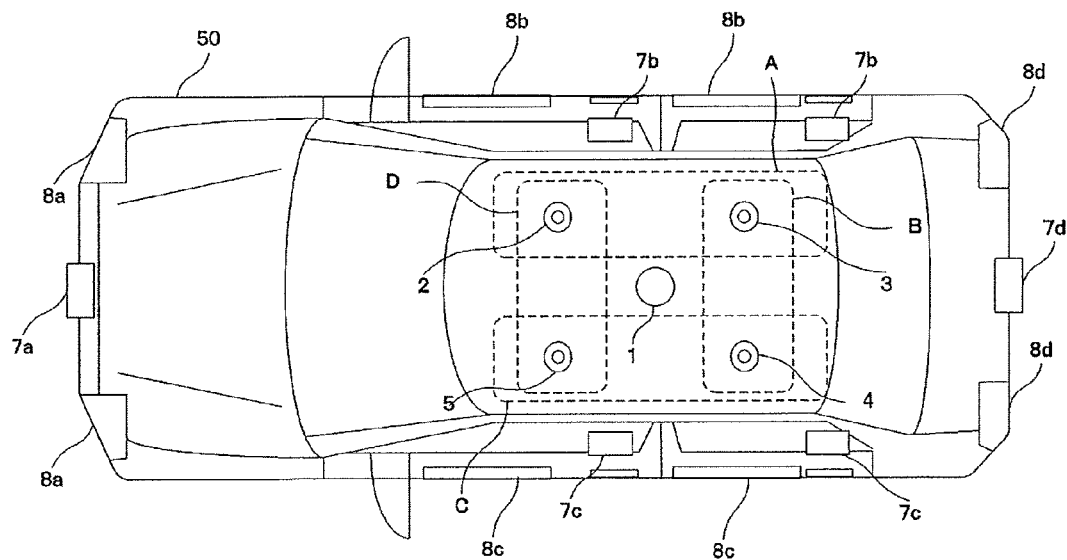
FIG. 2 is a diagram showing installation positions of a transmission antenna and reception antennae in the detection device for a vehicle according to the embodiment of the present invention.
Figure 3:
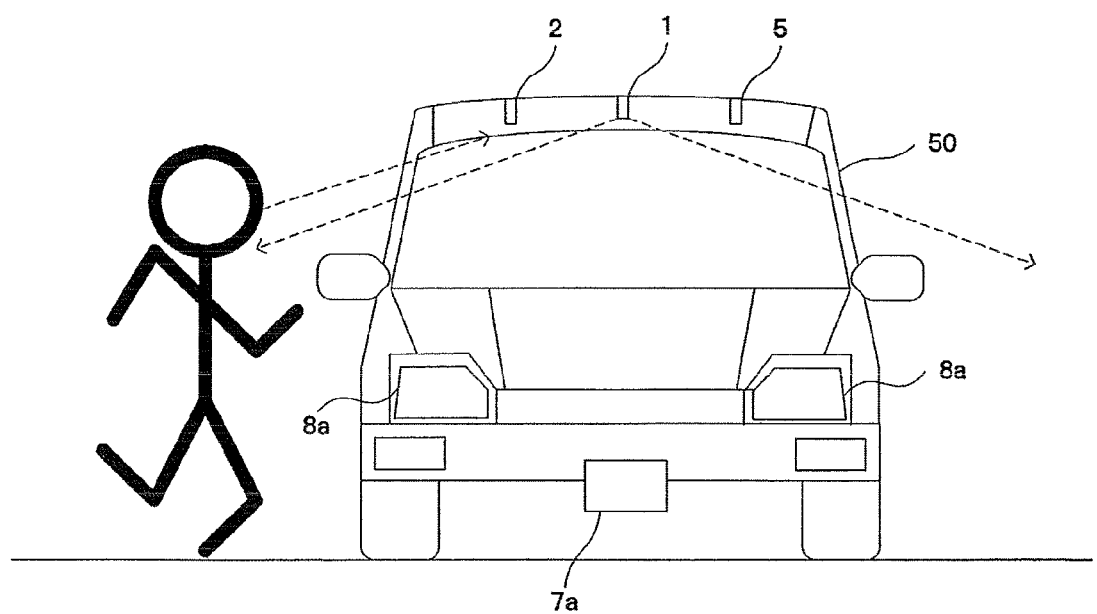
FIG. 3 is a front view of a vehicle equipped with the detection device for a vehicle according to the embodiment of the present invention.

FIG. 1 is a block diagram showing a configuration of a detection device 100 for a vehicle according to an embodiment of the present invention. FIG. 2 is a diagram showing installation positions of a transmission antenna 1 and reception antennae 2, 3, 4, and 5 shown in FIG. 1. FIG. 3 is a front view of a vehicle 50 shown in FIG. 2.

With reference to FIG. 1, the detection device 100 for a vehicle according to the embodiment of the present invention functions as a moving body detection sensor. As components of the detection device 100 for a vehicle, a transmission antenna 1 for transmitting a radio wave, reception antennae 2, 3, 4, and 5 for receiving the radio wave, and an abnormality detection calculation section 6 for detecting a motion of a person, are installed in the vehicle 50 shown in FIG. 2.

In the detection device 100 for a vehicle, a radio wave transmitted from the transmission antenna 1 continuously or at regular intervals is received by the reception antennae 2, 3, 4, and 5, and the abnormality detection calculation section 6 performs signal processing based on the radio wave, thereby detecting a motion of a person outside the vehicle 50, and a motion of a person intruding into the vehicle 50.

The detection device 100 for a vehicle is an arrayed radio wave sensor, and realizes a moving body detection function by utilizing change in radio wave propagation. Further, there are no limitations, in principle, on the frequency, the bandwidth, and the like of the radio wave used by the detection device 100 for a vehicle.

(Transmission Antenna and Reception Antennae)

With reference to FIGS. 2 and 3, the transmission antenna 1 is a non-directional antenna, and is installed in the vehicle 50. Specifically, the transmission antenna 1 is installed in the interior of the vehicle 50. For example, the transmission antenna 1 is installed inside an interior trim part at substantially the center of a ceiling.

The reception antennae 2, 3, 4, and 5 are installed at different positions in the vehicle 50 so as to have different reception areas. Specifically, the reception antenna 2 is installed at a right-side front part of the vehicle 50. The reception antenna 3 is installed at a right-side rear part of the vehicle 50. The reception antenna 4 is installed at a left-side rear part of the vehicle 50. The reception antenna 5 is installed at a left-side front part of the vehicle 50.

More specifically, as shown in FIG. 3, the reception antennae 2, 3, 4, and 5 are installed inside the interior trim part at the ceiling in the interior of the vehicle 50, and wirings are provided between a roof part and the interior trim part. The reception antennae 2, 3, 4, and 5 are directional antennae, and are installed so that the directions of the directivities thereof are toward the outside of the vehicle 50.

Inside the vehicle 50, a radio wave transmitted from the transmission antenna 1 is received, directly or after reflected, by the reception antennae 2, 3, 4, and 5. Outside the vehicle 50, the radio wave transmitted from the transmission antenna 1 goes out of the vehicle 50 through a window or the like of the vehicle 50, and is reflected by people around the vehicle 50, road surface, or the like. The reflected wave again enters the vehicle 50 through a window or the like, and is received by the reception antennae 2, 3, 4, and 5.

(Abnormality Detection Calculation Section)

Figure 4:
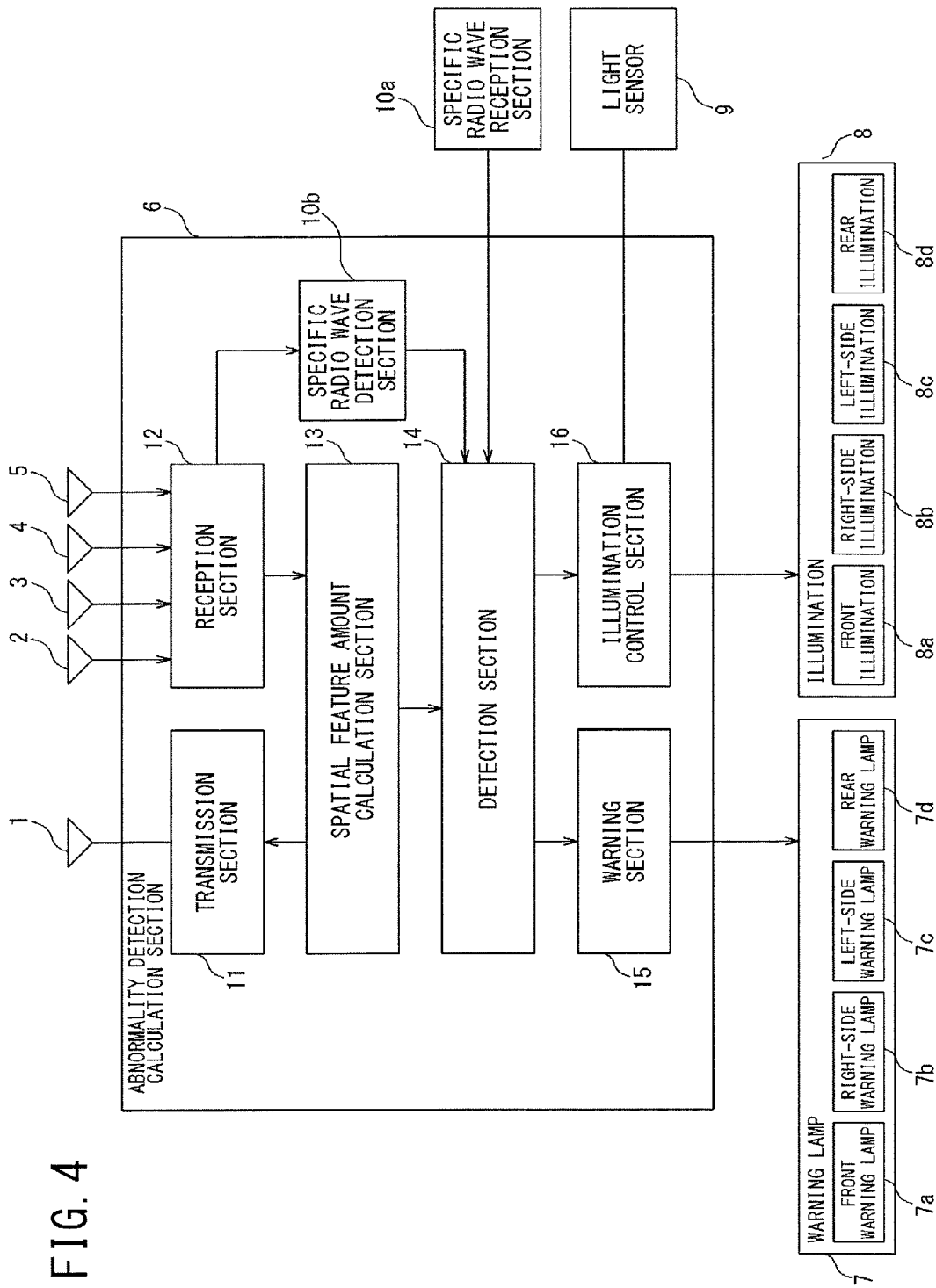
FIG. 4 is a block diagram showing a configuration of an abnormality detection calculation section of the detection device for a vehicle according to the embodiment of the present invention.

FIG. 4 is a block diagram showing a configuration of the abnormality detection calculation section 6 shown in FIG. 1. With reference to FIG. 4, the abnormality detection calculation section 6 includes a specific radio wave detection section 10b, a transmission section 11, a reception section 12, a spatial feature amount calculation section 13, a detection section 14, a warning section 15, and an illumination control section 16.

(i) Transmission Section and Reception Section

The transmission section 11 performs a transmission process of transmitting a radio wave of a specific frequency from the transmission antenna 1. The reception section 12 extracts the radio wave of the specific frequency from each of the radio waves received by the reception antennae 2, 3, 4, and 5, and performs a predetermined reception process on the extracted radio waves to generate digital signals, and outputs the digital signals to the spatial feature amount calculation section 13.

Further, the reception section 12 outputs the radio waves received by the reception antennae 2, 3, 4, and 5 to the specific radio wave detection section 10b. The specific radio wave detection section 10b detects whether or not each of the radio waves received by the reception antennae 2, 3, 4, and 5 is a specific radio wave, and outputs the result of the detection to the detection section 14. The "specific radio wave" is, for example, a radio wave transmitted from a smart key owned by the driver of the vehicle 50.

(ii) Spatial Feature Amount Calculation Section

Upon receiving, from the reception section 12, the digital signals corresponding to the reception antennae 2, 3, 4, and 5, the spatial feature amount calculation section 13 calculates, based on the digital signals, levels and phases of the radio waves received by the reception antennae 2, 3, 4, and 5. Then, based on the result of the calculation, the spatial feature amount calculation section 13 calculates spatial feature amounts P(t) based on the radio waves received by the reception antennae 2, 3, 4, and 5.

More specifically, the spatial feature amount calculation section 13 extracts a spatial feature amount P(t) by using an arrival angular distribution, like in the configuration disclosed in Patent Literature 1, for example.

That is, the spatial feature amount calculation section 13 calculates an inner product of eigenvectors to extract a spatial feature amount P(t). The inner product indicates an amount of change from an initial vector as a comparison reference Assuming that an initial vector, i.e., an eigenvector in a case where there is no intruder, is vno and an eigenvector at observation time t is vob(t), a spatial feature amount P(t) is expressed by the following equation:

$$P(t) = vno \cdot vob(t)$$

(iii) Detection Section

The detection section 14 detects a motion of a person in the reception areas of the reception antennae 2, 3, 4, and 5, based on the spatial feature amounts P(t) calculated by the spatial feature amount calculation section 13. That is, the detection section 14 performs processes described below, depending on whether or not the radio wave transmitted from the transmission antenna 1 has a bandwidth.

(Case where Radio Wave Having No Bandwidth is Transmitted)

In a case where a radio wave transmitted from the transmission antenna 1 has no bandwidth, the spatial feature amount calculation section 13 separates the four reception antennae 2, 3, 4, and 5 into a plurality of sets of two antennae, specifically as follows:

Set A: reception antenna 2 and reception antenna 3
Set B: reception antenna 3 and reception antenna 4
Set C: reception antenna 4 and reception antenna 5
Set D: reception antenna 5 and reception antenna 2

Then, the spatial feature amount calculation section 13 calculates, for the set A, a spatial feature amount P(t) in the set A, based on the levels of the radio waves received by the reception antennae 2 and 3. Likewise, the spatial feature amount calculation section 13 calculates a spatial feature amount P(t) for each of the sets B, C, and D.

The detection section 14 determines whether or not the spatial feature amount P(t) calculated for each of the sets A, B, C, and D is larger than a threshold Th1, thereby detecting a motion of a person in an area corresponding to each set. Then, the detection section 14 identifies an area where a motion of a person is detected among the areas corresponding to the respective sets, as a direction in which a person approaches the vehicle 50.

That is, when the detection section 14 detects a motion of a person with respect to the set A, the detection section 14 identifies that an area where the motion of the person is detected is an area to the right of the vehicle 50. When the detection section 14 detects a motion of a person with respect to the set B, the detection section 14 identifies that an area where the motion of the person is detected is an area behind the vehicle 50. When the detection section 14 detects a motion of a person with respect to the set C, the detection section 14 identifies that an area where the motion of the person is detected is an area to the left of the vehicle 50. When the detection section 14 detects a motion of a person with respect to the set D, the detection section 14 identifies that an area where the motion of the person is detected is an area in front of the vehicle 50.

(Case where Radio Wave Having Bandwidth is Transmitted)

In a case where a radio wave transmitted from the transmission antenna 1 has a bandwidth, for example, in a case where an impulse response is transmitted, the spatial feature amount calculation section 13 calculates a level and an arrival timing of each of the radio waves received by the reception antennae 2, 3, 4, and 5, and calculates, based on the result of the above calculation, a spatial feature amount P(t) of each of the radio waves received by the reception antennae 2, 3, 4, and 5.

The detection section 14 determines whether or not the spatial feature amount P(t) calculated for each of the radio waves received by the reception antennae 2, 3, 4, and 5 is larger than the threshold Th1, thereby detecting a motion of a person in each of the reception areas of the reception antennae 2, 3, 4, and 5.

Then the detection section 14 identifies an area where a motion of a person is detected among the respective reception areas, as a direction in which the person approaches the vehicle 50.

Further, based on the magnitudes of the spatial feature amounts P(t) calculated by the spatial feature amount calculation section 13, the detection section 14 determines whether there is a motion of a person outside the vehicle 50 or there is a motion of a person intruding into the vehicle 50.

When a person intrudes into the vehicle 50, open/close of a door of the vehicle 50 or breakage of window glass of the vehicle 50 occurs, and therefore, the spatial feature amount P(t) in this case is increased as compared to the case where there is no intrusion into the vehicle 50. On the other hand, when there is a motion of a person outside the vehicle 50, the spatial feature amount P(t) is reduced.

By utilizing this difference, the detection section 14 determines that there is a motion of a person outside the vehicle 50 in a case where the spatial feature amount P(t) is equal to or smaller than a threshold Th2 (Th2>Th1), and determines that there is a motion of a person intruding into the vehicle 50 in a case where the spatial feature amount P(t) is larger than the threshold Th2.

Figure 5:
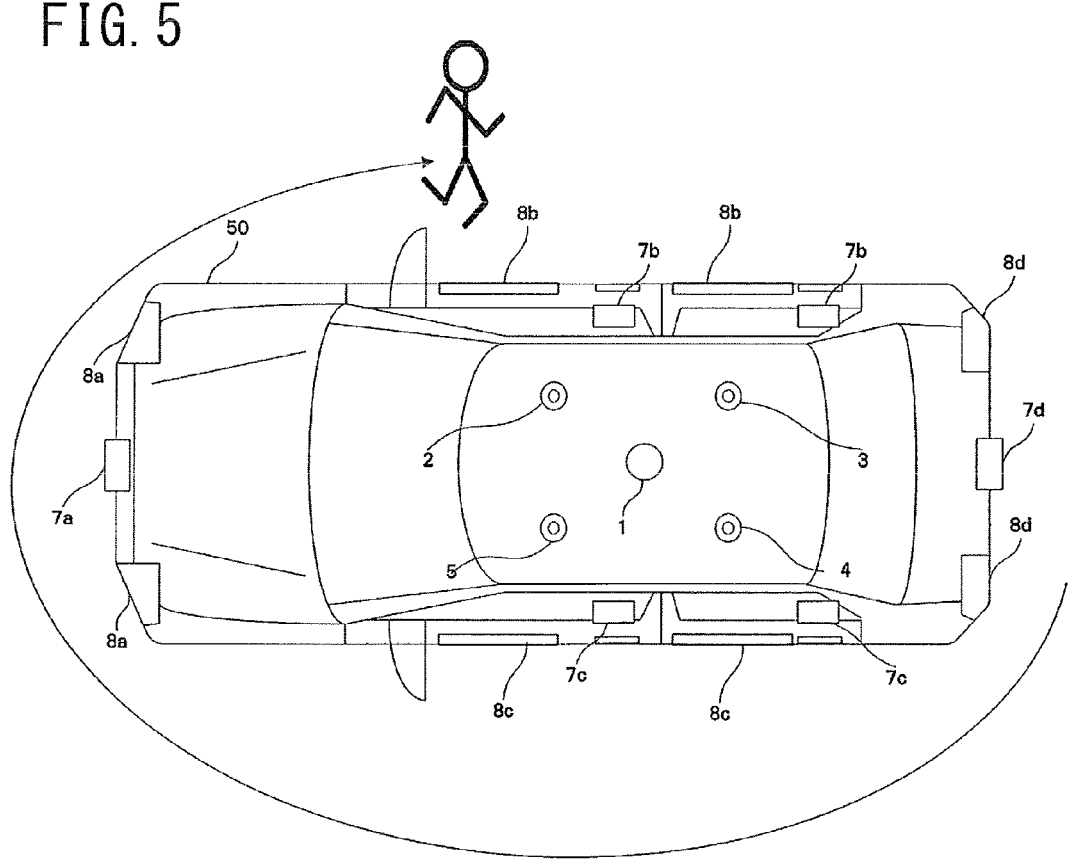
FIG. 5 is a diagram showing an example of a motion of a person who is a suspicious person.
Figure 6:
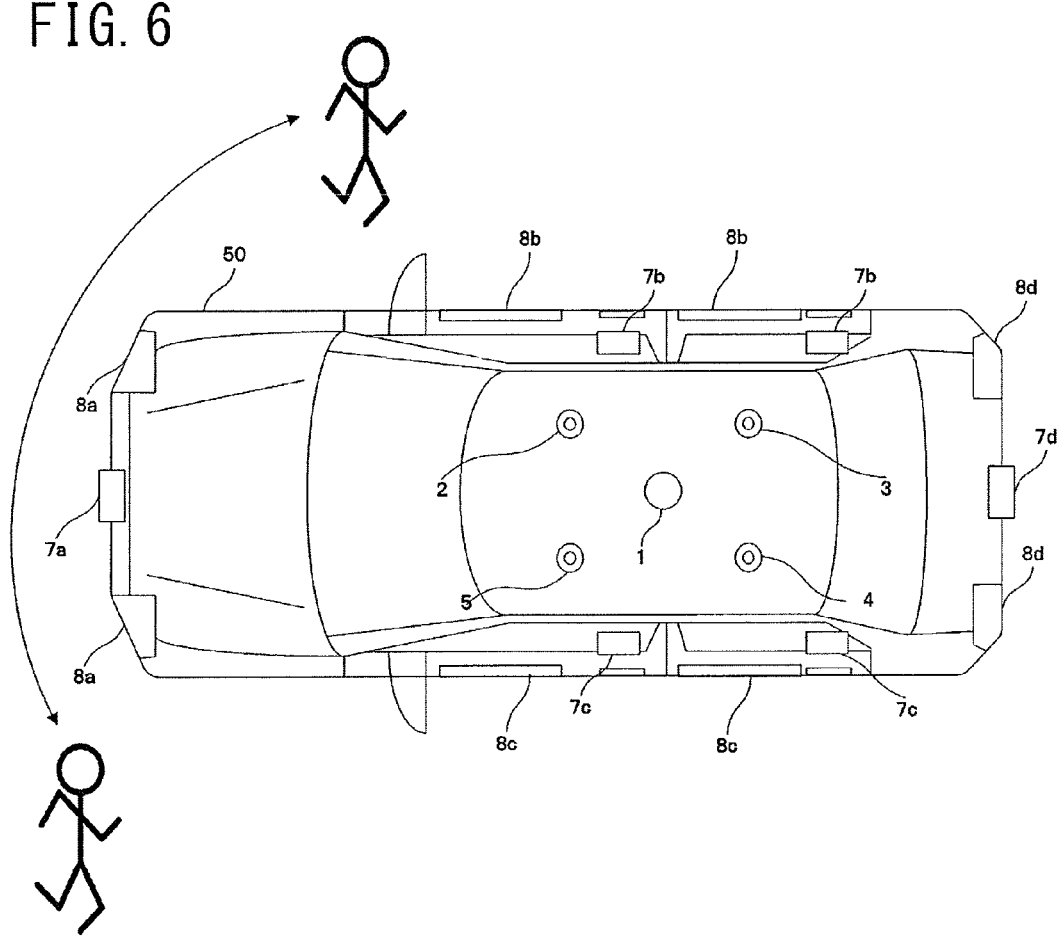
FIG. 6 is a diagram showing an example of a motion of a person who is a suspicious person.

FIGS. 5 and 6 are diagrams showing examples of motions of a person as a suspicious person. As described below, in a case where a detected motion of a person satisfies a predetermined condition, the detection section 14 determines that the person whose motion is detected is a suspicious person, and distinguishes the suspicious person from a person just passing by the vehicle 50. Specifically, in a case where the detection section 14 continuously detects a motion of a person for a predetermined time period or more, the detection section 14 determines that the person whose motion is detected stays around the vehicle 50 for the predetermined time period or more, and that the person is not a person just passing by the vehicle 50 but a suspicious person.

Another determination method is as follows. That is, in a case where the detection section 14 detects motions of a person successively from a plurality of reception antennae, the detection section 14 determines that the person whose motion is detected is a suspicious person. The "successively" means that the detection section 14 does not determine that a suspicious person is detected even when the detection section 14 simultaneously detects a motion of a person passing in front of the vehicle 50 and a motion of another person passing behind the vehicle 50, for example.

That is, with reference to FIG. 5, in a case where the detection section 14 recognizes a series of motions of a person such that the detection section 14 detects a motion of a person at the left side of the vehicle 50 after detecting a motion of the same person behind the vehicle 50, and thereafter detects a motion of the same person in front of the vehicle 50, the detection section 14 determines that a suspicious person is detected.

Still another determination method is as follows. That is, in a case where the detection section 14 detects a motion of a person with respect to a second reception antenna after detecting a motion of the person with respect to a first reception antenna among the reception antennae 2, 3, 4, and 5, and thereafter, again detects a motion of the person with respect to the first reception antenna, the detection section 14 determines that a suspicious person is detected.

Specifically, with reference to FIG. 6, in a case where a radio wave having no bandwidth is transmitted, for example, when the detection section 14 detects a motion of a person with respect to the set of the reception antennae 3 and 4 after detecting a motion of the person with respect to the set of the reception antennae 2 and 3, and thereafter, again detects a motion of the person with respect to the set of the reception antennae 2 and 3, the detection section 14 determines that the person whose motion is detected is wandering around the vehicle 50 and is not a person just passing by the vehicle 50 but a suspicious person.

Yet another determination method is as follows. That is, in a case where the detection section 14 continuously detects a motion of a person for a predetermined time period or more with respect to the same reception antenna, the detection section 14 determines that the person whose motion is detected stays in a specific area around the vehicle 50, such as an area near a door on the driver's seat side, for the predetermined time period or more, and is not a person just passing by the vehicle but a suspicious person.

On the other hand, in a case where reception of a specific radio wave is detected in the detection device 100 for a vehicle, the detection section 14 determines that a person whose motion is detected is not a suspicious person. The vehicle 50 is equipped with a specific radio wave reception section 10a for receiving a specific radio wave such as a radio wave transmitted from a smart key, for example. That is, the specific radio wave reception section 10a is a reception section included in a smart key system for releasing door lock upon receiving a radio wave transmitted from a smart key. The specific radio wave is received by the reception antennae 2, 3, 4, and 5 or an antenna included in the specific radio wave reception section 10a.

When the specific radio wave is received by the reception antennae 2, 3, 4, and 5, the specific radio wave detection section 10b detects the specific radio wave, and outputs the result of the detection to the detection section 14. When the specific radio wave is received by the specific radio wave reception section 10a, the specific radio wave reception section 10a detects the specific radio wave and outputs the result of the detection to the detection section 14.

It is noted that the vehicle 50 need not be equipped with both the specific radio wave reception section 10a and the specific radio wave detection section 10b, and may be equipped with either of them.

(iv) Warning Section

When the warning section 15 receives the result of the detection by the detection section 14 and recognizes that the detection section 14 has detected a motion of a person, the warning section 15 performs warning by means of light. Specifically, the warning section 15 controls lighting of a front warning lamp 7a, right-side warning lamps 7b, left-side warning lamps 7c, and a rear warning lamp 7d (hereinafter, these lamps are sometimes collectively referred to as "warning lamp 7") which are installed inside the vehicle 50 at positions visible from the outside of the vehicle 50.

As shown in FIG. 2, the front warning lamp 7a is installed in the vicinity of a license plate at the front of the vehicle 50. The right-side warning lamps 7b are installed in the vicinity of right-side door knobs of the vehicle 50. The left-side warning lamps 7c are installed in the vicinity of left-side door knobs of the vehicle 50. The rear warning lamp 7d is installed in the vicinity of a license plate at the rear of the vehicle 50.

The warning lamp 7 is lit in a color such as yellow or red, and also outputs an alarm. The warning section 15 controls the warning lamp 7 so as to be lit in yellow when the detection section 14 detects a motion of a person, and controls the warning lamp 7 so as to be lit in red when the detection section 14 detects a suspicious person. Further, the warning section 15 controls the warning lamp 7 so as to be lit in red and output an alarm when the detection section 14 detects a motion of a person intruding into the vehicle 50.

In a case where reception of a specific radio wave is detected in the detection device 100 for a vehicle and the detection section 14 determines that a person whose motion is detected is not a suspicious person, the warning section 15 does not light the warning lamp 7 even when the detection section 14 detects a motion of a person. The specific radio wave is a radio wave transmitted from a smart key owned by a driver of the vehicle 50, for example.

(v) Illumination control section

When receiving the result of the detection by the detection section 14, the illumination control section 16 controls lighting of front illuminations 8a, right-side illuminations 8b, left-side illuminations 8c, and rear illuminations 8d (hereinafter, these illuminations are sometimes collectively referred to as "illumination 8") which are installed on the vehicle 50. As shown in FIG. 2, the front illuminations 8a are headlights provided at the front of the vehicle 50. The right-side illuminations 8b are illumination equipment that is provided in the vicinity of right-side doors of the vehicle 50 and illuminates the feet of the driver when the driver gets in and out of the vehicle 50. The left-side illuminations 8c are illumination equipment that is provided in the vicinity of left-side doors of the vehicle 50 and illuminates the feet of the driver when the driver gets in and out of the vehicle 50. The rear illuminations 8d are taillights provided at the rear of the vehicle 50.

In a case where reception of a specific radio wave is detected in the detection device 100 for a vehicle, the illumination control section 16 lights the illumination 8. In the present embodiment, when it is dark around the vehicle 50 to an extent that the illumination 8 needs to be lit and reception of the specific radio wave is detected in the detection device 100 for a vehicle, the illumination control section 16 lights an illumination corresponding to a reception antenna that receives the radio wave by which the detection section 14 detects a motion of a person.

The vehicle 50 is equipped with, for example, a photodetection sensor 9 that detects brightness of light. When the illumination control section 16 receives a result of detection by the photodetection sensor 9, the illumination control section 16 determines the brightness around the vehicle 50.

For example, in a case where the illumination control section 16 determines, based on the result of detection by the photodetection sensor 9, that it is dark around the vehicle 50 to an extent that the illumination 8 needs to be lit, and where the reception antennae 2 and 3 receive a radio wave transmitted from the smart key owned by the driver of the vehicle 50, the illumination control section 16 lights the right-side illuminations 8b to assist the driver to get on the vehicle 50.

It is noted that the number of the illuminations 8 is not necessarily more than one. Further, in a case where there is no illumination corresponding to a reception antenna that receives a radio wave by which the detection section 14 detects a motion of a person, the illumination control section 16 lights none of the illuminations.

Further, the above-mentioned warning section 15 may control and light not only the warning lamp 7 but also the illumination 8 when the detection section 14 detects a motion of a person.

[Operation]

The following will describe an operation of the detection device 100 for a vehicle according to the embodiment of the present invention to detect occurrence of abnormality in the vehicle 50 and threaten a suspicious person.

Figure 7:
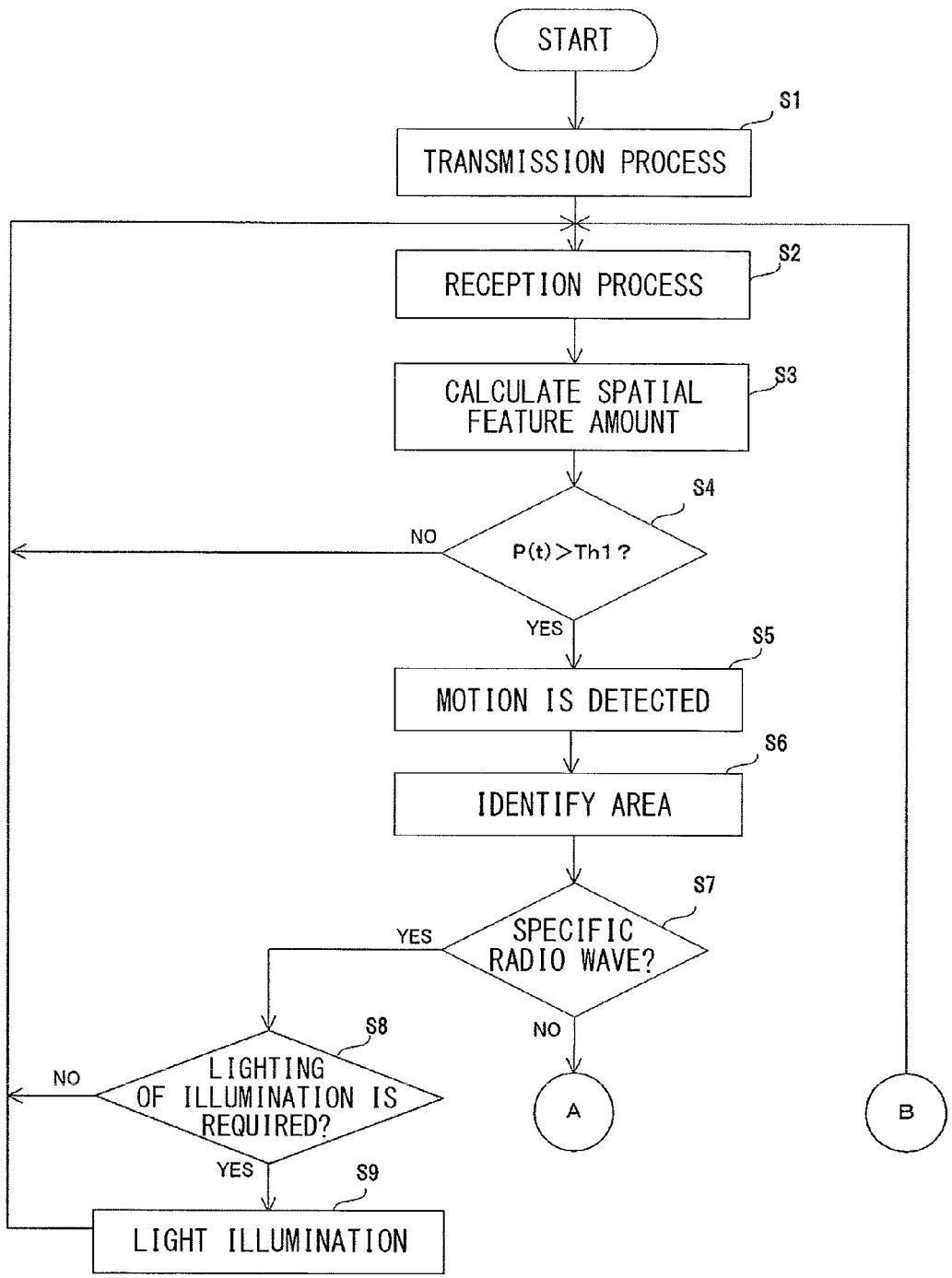
FIG. 7 is a flowchart (part 1) showing an operation procedure when the detection device for a vehicle according to the embodiment of the present invention detects abnormality that occurs in a vehicle, and threatens a suspicious person.
Figure 8:
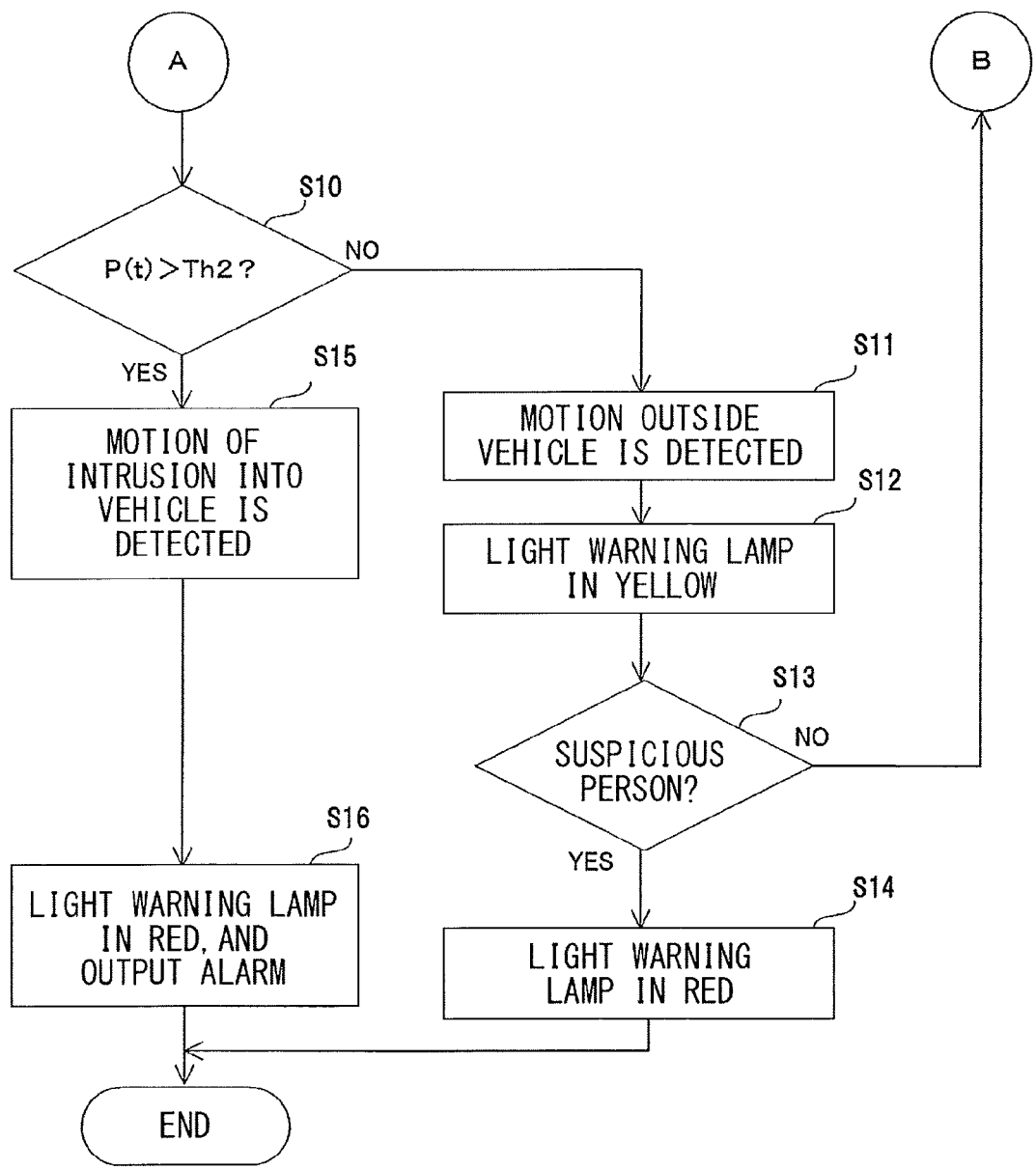
FIG. 8 is a flowchart (part 2) showing an operation procedure when the detection device for a vehicle according to the embodiment of the present invention detects abnormality that occurs in a vehicle, and threatens a suspicious person.

FIGS. 7 and 8 are flowcharts showing an operation procedure when the detection device 100 for a vehicle according to the embodiment of the present invention detects occurrence of abnormality in the vehicle 50, and threatens a suspicious person.

The detection device 100 for a vehicle reads a program including steps of the flowcharts from a memory (not shown), and executes the program. This program can be externally installed. The program to be installed is distributed while being stored in a recording medium for distribution, for example.

With reference to FIGS. 7 and 8, first, the transmission section 11 in the abnormality detection calculation section 6 performs a process of transmitting a radio wave of a specific frequency, and the radio wave is transmitted from the transmission antenna 1 installed at a substantially center portion of the ceiling inside the vehicle 50 (step S1).

Next, the radio wave reflected inside the vehicle 50 or the radio wave reflected by people, road surface, or the like outside the vehicle 50 is received by the reception antennae 2, 3, 4, and 5, and the reception section 12 in the abnormality detection calculation section 6 extracts the radio wave of the specific frequency from each of the received radio waves, and subjects the extracted radio wave to a predetermined reception process (step S2).

Next, the spatial feature amount calculation section 13 in the abnormality detection calculation section 6 receives digital signals generated by the reception section 12, and calculates a spatial feature amount $P(t)$ based on each of the radio waves received by the reception antennae 2, 3, 4, and 5 (step S3). Then, the detection section 14 in the abnormality detection calculation section 6 detects a motion of a person based on the calculated spatial feature amount $P(t)$ (step S4). Specifically, the detection section 14 determines whether or not the spatial feature amount $P(t)$ is larger than the threshold Th1.

When the spatial feature amount $P(t)$ is equal to or smaller than the threshold Th1 ("NO" in step S4), the detection section 14 determines that there is no motion of a person inside and outside the vehicle 50. Then, the process returns to the reception process (step S2) and the abovementioned operation is repeated.

When the spatial feature amount $P(t)$ is larger than the threshold Th1 ("YES" in step S4), the detection section 14 determines that a motion of a person is detected (step S5), and identifies an area where the motion of the person is detected, by using the above-mentioned method (step S6).

Next, when detecting the motion of the person, the detection section 14 identifies whether or not a specific radio wave, e.g., a radio wave transmitted from a smart key, is being received (step S7), outputs the result of the identification to the warning section 15 and the illumination control section 16.

Based on the result of the identification from the detection section 14, if the specific radio wave is being received ("YES" in step S7) when the motion of the person is detected, the illumination control section 16 further acquires, from the photodetection sensor 9, a detection result indicating whether or not it is dark around the vehicle 50 to an extent that the illumination 8 needs to be lit (step S8).

When it is dark around the vehicle 50 to an extent that the illumination 8 needs to be lit ("YES" in step S8), the illumination control section 16 controls lighting of the illumination 8 so as to light an illumination corresponding to a reception antenna that receives a radio wave by which the motion of the person is detected, e.g., the headlight at the front (step S9). On the other hand, if it is light around the vehicle 50 to an extent that the illumination 8 need not be lit ("NO" in step S8), the process returns to the reception process (step S2) and the above-mentioned operation is repeated.

On the other hand, if the specific radio wave is not received when the motion of the person is detected ("NO" in step S7), the detection section 14 determines whether the detected motion of the person is a motion outside the vehicle 50 or a motion of a person intruding into the vehicle 50 (step S10). Specifically, the detection section 14 determines whether or not the spatial feature amount $P(t)$ is larger than the threshold Th2.

When the spatial feature amount $P(t)$ is equal to or smaller than the threshold Th2 ("NO" in step S10), the detection section 14 determines that the detected motion of the person is a motion outside the vehicle 50 (step S11). Upon receiving the result of the determination from the detection section 14, the warning section 15 controls lighting of the warning lamp 7 so that a warning lamp corresponding to a reception antenna that receives a radio wave by which the motion of the person is detected is lit in yellow (step S12).

Next, the detection section 14 determines whether or not the person whose motion is detected is a suspicious person, by using the above-mentioned various methods, based on a duration time of the state in which the motion of the person is detected, and the area where the motion of the person is detected (step S13).

When the detection section 14 determines that the person whose motion is detected is not a suspicious person ("NO" in step S13), the process returns to the reception process (step S2) and the above-mentioned operation is repeated. Then, the spatial feature amount calculation section 13 calculates a spatial feature amount $P(t)$ (step S3), and when the calculated spatial feature amount $P(t)$ is equal to or smaller than the threshold Th1, that is, when no motion of a person is detected by the detection section 14 (step S4), the warning section 15 controls the warning lamp 7 to turn off the warning lamp being lit in yellow.

On the other hand, when the detection section 14 determines that the person whose motion is detected is a suspicious person ("YES" in step S13), the warning section 15 causes the warning lamp being lit in yellow to be lit in red (step S14).

When the spatial feature amount $P(t)$ is larger than the threshold Th2 ("YES" in step S10), the detection section 14 determines that the detected motion of the person is a motion of a person intruding into the vehicle 50 (step S15). Then, in order to further enhance the threat to the suspicious person, the warning section 15 causes the warning lamp being lit in yellow to be lit in red, and controls the warning lamp to output an alarm (step S16).

By the way, in the technique disclosed in Non-Patent Literature 2, since an ultrasonic wave easy to attenuate in gas is used, a motion of a person outside a vehicle cannot be detected, and therefore, occurrence of abnormality cannot be detected until the vehicle is damaged.

In contrast to the above technique, the detection device 100 for a vehicle according to the embodiment of the present invention includes: the transmission antenna 1 that is installed inside the vehicle 50, and transmits a radio wave; and the reception antennae 2, 3, 4, and 5 that are installed in the vehicle 50, and receive the radio wave. Further, the detection device 100 for a vehicle includes the abnormality detection calculation section 6, and the abnormality detection calculation section 6 calculates a spatial feature amount $P(t)$ based on the radio wave received by each of the reception antennae 2, 3, 4, and 5, and detects, based on the calculated spatial feature amount $P(t)$, a motion of a person outside the vehicle 50 and a motion of a person intruding into the vehicle 50.

According to the above configuration, damage to the vehicle 50 can be prevented by detecting occurrence of abnormality before the vehicle 50 is damaged, and abnormality inside and outside the vehicle 50 can be accurately detected. For example, before a criminal commits a criminal act on the vehicle 50, approach of the criminal to the vehicle 50 can be detected. Therefore, it is possible to prevent a crime by, for example, threatening the criminal before he/she commits a criminal act to let him/her give up such an act.

Further, for example, open/close of a door of the vehicle 50 or breakage of window glass of the vehicle 50 can be detected, and therefore, occurrence of abnormality on the vehicle 50 can be speedily notified to an owner of the vehicle 50, a security company, or the like.

Further, the detection device 100 for a vehicle according to the embodiment of the present invention includes a plurality of reception antennae, and the abnormality detection calculation section 6 calculates a spatial feature amount P(t) based on the radio wave received by each of the reception antennae 2, 3, 4, and 5, and detects, based on the calculated spatial feature amounts P(t), a direction in which a person approaches the vehicle 50.

According to the above configuration, in a case where three or more reception antennae are installed, the abnormality detection calculation section 6 calculates a spatial feature amount P(t) for each of sets of two reception antennae, thereby detecting a motion of a person inside and outside the vehicle 50. Therefore, a reception area corresponding to a set of reception antennae can be identified as an area where a motion of a person is detected.

In a case where the transmission antenna 1 transmits a radio wave having a bandwidth, such as an impulse response, the abnormality detection calculation section 6 calculates a spatial feature amount P(t) for each of the radio waves received by the reception antennae, thereby detecting a motion of a person for each of the reception areas of the reception antennae.

Further, the detection device 100 for a vehicle according to the embodiment of the present invention includes four reception antennae, and the four reception antennae are installed at a right front part, a right rear part, a left front part, and a left rear part of the vehicle 50, respectively.

Since the plurality of reception antennae are spaced at large intervals as described above, the periphery of the vehicle 50 can be sectioned into the reception areas of the respective reception antennae 2, 3, 4, and 5. Further, by detecting a motion of a person in each of the reception areas, it is possible to more precisely identify an area where a motion of a person is detected around the vehicle 50.

Further, in the detection device 100 for a vehicle according to the embodiment of the present invention, the abnormality detection calculation section 6, based on the calculated spatial feature amounts P(t), determines a direction in which a motion of a person is detected, i.e., determines in which area a person is present among areas in front of, behind, to the right of, and to the left of the vehicle 50.

According to the above configuration, an area where a motion of a person is detected can be identified not only for a specific area such as an area near a driver's seat but also for an entire area around the vehicle 50.

Further, in the detection device 100 for a vehicle according to the embodiment of the present invention, the reception antennae 2, 3, 4, and 5 are installed at a ceiling inside the vehicle 50.

According to the above configuration, the reception antennae 2, 3, 4, and 5 can easily receive the radio wave coming from below. Therefore, even in a case where a person crouches down near the vehicle 50, the motion of the person can be accurately detected.

Further, in the case where the detection device 100 for a vehicle includes a plurality of reception antennae, the plurality of reception antennae can be spaced at large intervals from each other without being significantly influenced by the layout inside the vehicle 50, thereby enhancing reception sensitivity.

In addition, since the reception antennae 2, 3, 4, and 5 can be installed inside an interior trim part at the ceiling of the vehicle 50 and wirings can be provided between a roof part and the interior trim part, the appearance of the interior of the vehicle is not deteriorated.

Further, in the detection device 100 for a vehicle according to an embodiment of the present invention, the transmission antenna 1 is installed at the ceiling of the vehicle 50.

According to the above configuration, the radio wave transmitted from the transmission antenna 1 easily arrives at a lower area. Therefore, even in a case where a person crouches down near the vehicle 50, the motion of the person can be accurately detected.

Further, since the transmission antenna 1 can be installed inside the interior trim part at the ceiling of the vehicle 50 and wirings can be provided between the roof part and the interior trim part, the appearance of the interior of the vehicle is not deteriorated.

Further, in the detection device 100 for a vehicle according to the embodiment of the present invention, the reception antennae 2, 3, 4, and 5 are directional antennae.

According to the above configuration, when the directions of the directivities of the reception antennae 2, 3, 4 and 5 are set toward the outside of the vehicle 50, the probability of the reception antennae 2, 3, 4, and 5 receiving the radio wave reflected outside the vehicle 50 can be increased.

The detection device 100 for a vehicle according to the embodiment of the present invention further includes the warning section 15. When the abnormality detection calculation section 6 detects a motion of a person, the warning section 15 performs warning by means of light.

According to the above configuration, only a person staring at the vehicle 50 can be threatened, and therefore, it is possible to avoid an undesirable situation that a person just passing by the vehicle 50 is threatened.

Further, in the detection device 100 for a vehicle according to the embodiment of the present invention, when the abnormality detection calculation section 6 detects a motion of a person, the warning section 15 lights the warning lamp 7 installed inside the vehicle 50 at a position visible from the outside of the vehicle 50.

According to the above configuration, only a person who is interested in the inside of the vehicle 50 can be threatened.

The detection device 100 for a vehicle according to the embodiment of the present invention further includes the warning section 15 for controlling lighting of the plurality of warning lamps 7 that are visible from the outside of the vehicle 50 and are installed at different positions in the vehicle 50. The warning section 15 lights, among the plurality of warning lamps 7, a warning lamp 7 corresponding to a reception antenna that receives a radio wave by which the abnormality detection calculation section 6 detects a motion of a person.

According to the above configuration, only a person staring at the vehicle 50 can be threatened, and therefore, it is possible to avoid an undesirable situation that a person just passing by the vehicle 50 is threatened.

In addition, it is possible to enhance the threat to a suspicious person by causing the suspicious person to have a feeling of being watched.

Further, in the detection device 100 for a vehicle according to the embodiment of the present invention, in a case where a detected motion of a person satisfies a predetermined condition, the abnormality detection calculation section 6 determines that the person is a suspicious person except in a case where reception of a specific radio wave is detected in the detection device 100 for a vehicle. That is, the abnormality detection calculation section 6 determines, based on the detected motion of a person, whether or not the person is a suspicious person only in a case where reception of the specific radio wave is not detected in the detection device 100 for a vehicle.

According to the above configuration, a person who should not be threatened, such as a driver of the vehicle 50, is prevented from being threatened.

The detection device 100 for a vehicle according to the embodiment of the present invention further includes the illumination control section 16 for controlling lighting of the illumination of the vehicle 50. The illumination control section 16 lights the illumination 8 in a case where reception of the specific radio wave is detected in the detection device 100 for a vehicle.

According to the above configuration, it is possible to assist a driver of the vehicle 50 to get in the vehicle 50 by, for example, lighting the feet of the driver when the driver gets in the vehicle 50 at night.

Further, in the detection device 100 for a vehicle according to the embodiment of the present invention, in a case where the abnormality detection calculation section 6 continuously detects a motion of a person for a predetermined time period or more, the abnormality detection calculation section 6 determines that the person is a suspicious person.

According to the above configuration, it is possible to distinguish a suspicious person from a person just passing by the vehicle 50 with the simple determination process.

Further, in the detection device 100 for a vehicle according to the embodiment of the present invention, in a case where the abnormality detection calculation section 6 detects motions of a person successively with respect to a plurality of reception antennae, the abnormality detection calculation section 6 determines that the person is a suspicious person.

That is, in a case where the abnormality detection calculation section 6 recognizes a series of motions of a person such that the abnormality detection calculation section 6 detects a motion of a person at the left side of the vehicle 50 after detecting a motion of the same person behind the vehicle 50, and thereafter, detects a motion of the same person in front of the vehicle 50, the abnormality detection calculation section 6 determines that a suspicious person is detected.

According to the above configuration, distinction between a suspicious person and a person just passing by the vehicle 50 can be performed with high accuracy.

Further, in the detection device 100 for a vehicle according to the embodiment of the present invention, in a case where the abnormality detection calculation section 6 detects a motion of a person with respect to a second reception antenna after detecting a motion of the person with respect to a first reception antenna among the reception antennae 2, 3, 4, and 5, and thereafter, again detects a motion of the person with respect to the first reception antenna, the abnormality detection calculation section 6 determines that a suspicious person is detected.

As described above, by detecting a motion of a person who is wandering around the vehicle 50, distinction between a suspicious person and a person just passing by the vehicle 50 can be performed with high accuracy.

Further, in the detection device 100 for a vehicle according to the embodiment of the present invention, in a case where the abnormality detection calculation section 6 continuously detects a motion of a person for a predetermined time period or more with respect to the same reception antenna, the abnormality detection calculation section 6 determines that the person is a suspicious person.

As described above, by detecting a motion of a person who stays in a specific area around the vehicle 50 for the predetermined time period or more, distinction between a suspicious person and a person just passing by the vehicle 50 can be performed with high accuracy.

Further, in the detection device 100 for a vehicle according to the embodiment of the present invention, the abnormality detection calculation section 6 determines that there is a motion of a person outside the vehicle 50 in a case where the calculated spatial feature amount P(t) is small, and determines that there is a motion of a person intruding into the vehicle 50 in a case where the calculated spatial feature amount P(t) is large.

According to the above configuration, it is possible to distinguish a motion of a person approaching the vehicle 50 from a motion of a person intruding into the vehicle 50. Further, by distinguishing a motion of a person approaching the vehicle 50 from a motion of a person intruding into the vehicle 50, for example, the degree of risk of damage to the vehicle 50 can be graded, and thereby threat to a suspicious person and notification to an owner, a security company, or the like can be changed in stages according to the degree of risk.

In the detection device 100 for a vehicle according to the embodiment of the present invention, the number of the reception antennae is not necessarily more than one as long as the reception antenna can directly receive a radio wave transmitted from the transmission antenna and receive the radio wave reflected inside or outside the vehicle 50. In this case, the transmission antenna 1 may transmit any radio wave from which a receiving side can obtain information about the propagation path of the radio wave, such as the above-mentioned radio wave having a bandwidth.

Further, the detection device 100 for a vehicle according to the embodiment of the present invention is not limited to the above-mentioned configuration. For example, the warning section 15 may control the warning lamp 7 to perform various types of warning, such as red letters "On Alert" emerging when a person approaches the vehicle 50.

Another example of warning by the warning lamp 7 is as follows. That is, the warning section 15 may control the warning lamp 7 such that all of the front warning lamp 7a, the right-side warning lamps 7b, the left-side warning lamps 7c, and the rear warning lamp 7d are lit when a person approaches the vehicle 50.

When it is light around the vehicle 50, lighting of the warning lamp 7 is hard to be noticed by a suspicious person. Therefore, when the warning section 15 obtains a detection result from the photodetection sensor 9 that it is light around the vehicle 50 to an extent that the illumination 8 need not be lit, the warning section 15 may control the warning lamp 7 to output an alarm sound even if a detected motion of a person is a motion outside the vehicle 50.

Further, the detection device 100 for a vehicle according to the embodiment of the present invention may adopt a configuration as follows. That is, a vehicle 50 is equipped with a monitoring camera or the like, and when the detection section 14 detects a suspicious person, the abnormality detection calculation section 6 starts shooting with the monitoring camera turned to an area where the suspicious person is present, and transmits the shot video to a mobile terminal of a driver, or the like.

(Modification)

Hereinafter, a modification of the embodiment of the present invention will be described with reference to the drawings. In the drawings, the same or corresponding components are denoted by the same reference characters, and description thereof will not be repeated.

A detection device 100 for a vehicle according to the modification of the embodiment of the present invention is different from the detection device 100 for a vehicle according to the above-mentioned embodiment in the positions where the reception antennae 2, 3, 4, and 5 are installed in the vehicle 50.

Figure 9:
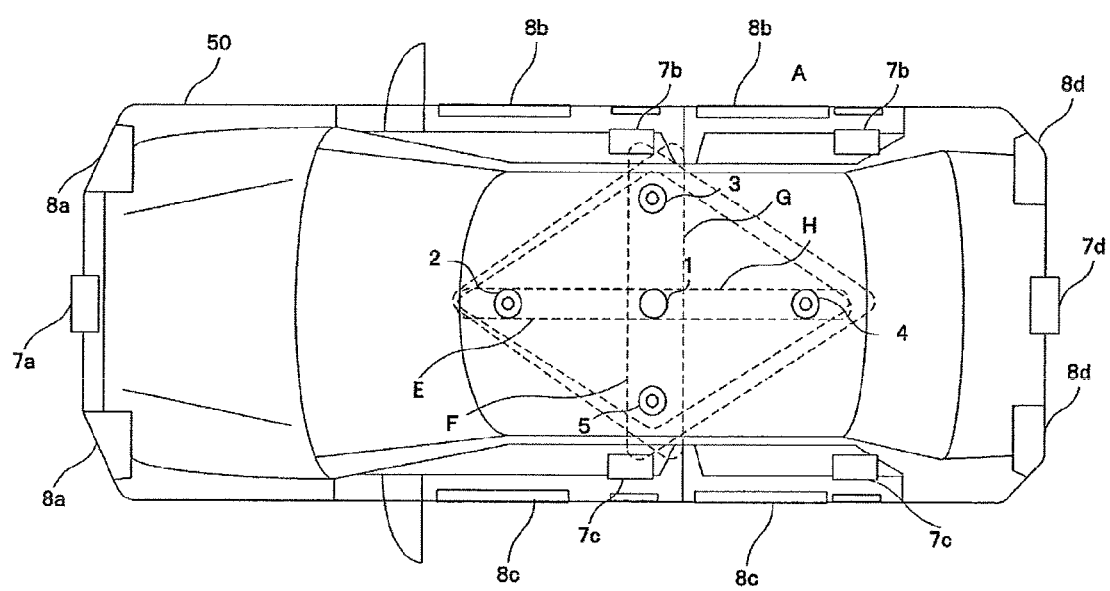
FIG. 9 is a diagram showing installation positions of a transmission antenna and reception antennae in a detection device for a vehicle according to a modification of the embodiment of the present invention.

FIG. 9 is a diagram showing the installation positions of the transmission antenna 1 and the reception antennae 2, 3, 4, and 5 of the detection device 100 for a vehicle according to the modification of the embodiment of the present invention.

With reference to FIG. 9, the reception antennae 2, 3, 4, and 5 are installed at different positions in the vehicle 50 so that the reception areas thereof are different from each other. Specifically, the reception antenna 2 is installed at a substantially center, in a left-right direction, of a front part of the vehicle 50. The reception antenna 3 is installed at a substantially center, in a front-rear direction, of a right-side part of the vehicle 50. The reception antenna 4 is installed at a substantially center, in the left-right direction, of a rear part of the vehicle 50. The reception antenna 5 is installed at a substantially center, in the front-rear direction, of a left-side part of the vehicle 50.

More specifically, as shown in FIG. 3, the reception antennae 2, 3, 4, and 5 are installed inside the interior trim part at the ceiling in the interior of the vehicle, and wirings are provided between the roof part and the interior trim part. The reception antennae 2, 3, 4, and 5 are directional antennae, and are arranged so that the directions of directivities thereof are set toward the outside of the vehicle 50.

Since the reception antennae 2, 3, 4, and 5 are installed at the above-mentioned positions, the detection section 14 performs, as follows, a process of detecting a motion of a person in each area around the vehicle 50 in a case where a radio wave transmitted from the transmission antenna 1 has no bandwidth.

That is, in the case where the radio wave transmitted from the transmission antenna 1 has no bandwidth, the spatial feature amount calculation section 13 separates the four reception antennae 2, 3, 4, and 5 into four sets of three antennae, specifically as follows:

Set E: reception antenna 2, reception antenna 3, and reception antenna 4;

Set F: reception antenna 3, reception antenna 4, and reception antenna 5;

Set G: reception antenna 4, reception antenna 5, and reception antenna 2; and Set H: reception antenna 5, reception antenna 2, and reception antenna 3.

Then, for the set E, the spatial feature amount calculation section 13 calculates a spatial feature amount P(t) in the set E, based on the levels of the radio waves received by the reception antennae 2, 3, and 4. Likewise, the spatial feature amount calculation section 13 calculates a spatial feature amount P(t) for each of the sets F, G, and H.

The detection section 14 determines whether or not the spatial feature amount P(t) calculated for each of the sets E, F, G, and H is larger than a threshold Th1, thereby detecting a motion of a person in each area corresponding to each set.

Then, the detection section 14 identifies an area where a motion of a person is detected among the areas corresponding to the respective sets.

That is when the detection section 14 detects a motion of a person with respect to the set E, the detection section 14 identifies that an area where the motion of the person is detected is an area to the right of the vehicle 50. When the detection section 14 detects a motion of a person with respect to the set F, the detection section 14 identifies that an area where the motion of the person is detected is an area behind the vehicle 50. When the detection section 14 detects a motion of a person with respect to the set G, the detection section 14 identifies that an area where the motion of the person is detected is an area to the left of the vehicle 50. When the detection section 14 detects a motion of a person with respect to the set H, the detection section 14 identifies that an area where the motion of the person is detected is an area in front of the vehicle 50.

As described above, the detection device 100 for a vehicle according to the modification of the embodiment of the present invention includes the four reception antennae, and the four reception antennae are installed at a substantially center, in a left-right direction, of a front part of the vehicle 50, a substantially center, in the left-right direction, of a rear part of the vehicle 50, a substantially center, in a front-rear direction, of a right-side part of the vehicle 50, and a substantially center, in the front-rear direction, of a left-side part of the vehicle 50, respectively.

As described above, since the plurality of reception antennae are spaced at large intervals, the periphery of the vehicle 50 can be sectioned into the reception areas corresponding to the reception antennae 2, 3, 4, and 5, respectively. Further, by detecting a motion of a person in each of the reception areas, it is possible to identify, more precisely, an area where a motion of a person is detected around the vehicle 50.

In addition, when a person approaches the vehicle 50 from a frontward direction or a rearward direction, the distance between the reception antenna installed at the front or rear of the vehicle 50 and the approaching person is short, and therefore, the calculated spatial feature amount P(t) is large, which makes it easy to detect a motion of a person.

Since the other configurations and operations are identical to those of the detection device 100 for a vehicle according to the above-mentioned embodiment, detailed description thereof will not be repeated.

Note that the embodiments disclosed are to be considered in all respects as illustrative and not restrictive. The scope of the invention is indicated by the appended claims rather than by the foregoing meaning, and all changes which come within the meaning and range of equivalency of the claims are therefore intended to be embraced therein.

REFERENCE SIGNS LIST

1 transmission antenna
2, 3, 4, 5 reception antenna
6 abnormality detection calculation section
7 warning lamp
7*a* front warning lamp
7*b* right-side warning lamp
7*c* left-side warning lamp
7*d* rear warning lamp
8 illumination
8*a* front illumination
8*b* right-side illumination
8*c* left-side illumination
8*d* rear illumination 9 photodetection sensor
10a specific radio wave reception section
10b specific radio wave detection section
11 transmission section
12 reception section
13 spatial feature amount calculation section
14 detection section
15 warning section
16 illumination control section
50 vehicle
100 detection device for a vehicle

The invention claimed is:

1. A detection device for a vehicle, comprising:
a single transmission antenna installed inside the vehicle, the transmission antenna transmitting a radio wave;
a plurality of reception antennae installed inside the vehicle so as to surround the periphery of the transmission antenna, the reception antennae receiving the radio wave transmitted from the transmission antenna; and
an abnormality detection calculation section that calculates, based on digital signals of the radio waves received by the plurality of reception antennae, a spatial feature amount defined below, for each of the digital signals, and detects, based on the calculated spatial feature amounts, a motion of a person outside the vehicle and a motion of a person intruding into the vehicle, wherein
the spatial feature amount is an inner product of an eigenvector at reception of a digital signal during normal time and an eigenvector at reception of the digital signal during monitoring,
the abnormality detection calculation section determines, based on a detected motion of a person, whether or not the person is a suspicious person, only in a case where reception of a specific radio wave is not detected in the detection device for a vehicle.

2. The detection device for a vehicle according to claim 1, wherein the reception antennae are installed at a ceiling inside the vehicle.

3. The detection device for a vehicle according to claim 1, wherein the transmission antenna is installed at a ceiling inside the vehicle.

4. The detection device for a vehicle according to claim 1, wherein the reception antennae are directional antennae.

5. The detection device for a vehicle according to claim 1, including four pieces of the reception antennae, wherein
the four reception antennae are installed at a right front part, a right rear part, a left front part, and a left rear part of the vehicle, respectively.

6. The detection device for a vehicle according to claim 1, including four pieces of the reception antennae, wherein
the four reception antennae are provided at a substantially center, in a left-right direction, of a front part of the vehicle, a substantially center, in the left-right direction, of a rear part of the vehicle, a substantially center, in a front-rear direction, of a right-side part of the vehicle, and a substantially center, in the front-rear direction, of a left-side part of the vehicle, respectively.

7. The detection device for a vehicle according to claim 5, wherein the abnormality detection calculation section determines, based on the calculated spatial feature amounts, in which area a person is present among areas in front of, behind, to the right of and to the left of the vehicle.

8. The detection device for a vehicle according to claim 1, further including a warning section that performs warning by means of light when the abnormality detection calculation section detects the motion of the person.

9. The detection device for a vehicle according to claim 5, further including:
a warning section that controls lighting of a plurality of warning lamps installed at different positions in the vehicle, the warning lamps being visible from the outside of the vehicle, wherein
the warning section lights, among the plurality of warning lamps, a warning lamp corresponding to a reception antenna that receives a radio wave by which the abnormality detection calculation section detects the motion of the person.

10. The detection device for a vehicle according to claim 1, further including an illumination control section that controls lighting of an illumination of the vehicle, wherein
the illumination control section lights the illumination in a case where reception of a specific radio wave is detected in the detection device for a vehicle.

11. The detection device for a vehicle according to claim 1, wherein
in a case where the abnormality detection calculation section continuously detects a motion of a person for a predetermined time period or more, the abnormality detection calculation section determines that the person is a suspicious person.

12. The detection device for a vehicle according to claim 1, wherein
in a case where the abnormality detection calculation section detects motions of a person successively with respect to a plurality of the reception antennae, the abnormality detection calculation section determines that the person is a suspicious person.

13. The detection device for vehicle according to claim 12, wherein
the abnormality detection calculation section determines that a suspicious person is detected, in a case where the abnormality detection calculation section detects a motion of a person with respect to a second reception antenna after detecting a motion of the person with respect to a first reception antenna, among the plurality of reception antennae, and thereafter, again detects a motion of the person with respect to the first reception antenna.

14. The detection device for a vehicle according to claim 1, wherein
in a case where the abnormality detection calculation section continuously detects a motion of a person for a predetermined time period or more with respect to the same reception antenna, the abnormality detection calculation section determines that the person is a suspicious person.

15. The detection device for a vehicle according to claim 1, wherein
the abnormality detection calculation section determines that there is a motion of a person outside the vehicle in a case where the calculated spatial feature amount is small, and determines that there is a motion of a person intruding into the vehicle in a case where the calculated spatial feature amount is large.

16. An abnormality detection method used in a detection device for a vehicle, the detection device including a single transmission antenna installed inside the vehicle and a plurality of reception antennae installed inside the vehicle so as to surround the periphery of the transmission antenna, the method comprising the steps of:
transmitting a radio wave from the transmission antenna;
receiving the radio wave by the plurality of the reception antennae;

calculating, based on digital signals of the radio waves received by the plurality of reception antennae, a spatial feature amount defined below, for each of the digital signals; and detecting, based on the calculated spatial feature amounts, a motion of a person outside the vehicle and a motion of a person intruding into the vehicle, wherein the spatial feature amount is an inner product of an eigenvector at reception of a digital signal during normal time and an eigenvector at reception of the digital signal during monitoring, the method further comprising the step of determining, based on a detected motion of a person, whether or not the person is a suspicious person, only in a case where reception of a specific radio wave is not detected in the detection device for a vehicle.

17. An abnormality detection program used in a detection device for a vehicle, the detection device including a single transmission antenna installed inside the vehicle and a plurality of reception antennae installed inside the vehicle so as to surround the periphery of the transmission antenna, the abnormality detection program causing a computer to execute the steps of:

transmitting a radio wave from the transmission antenna;

receiving the radio wave by the plurality of the reception antennae;

calculating, based on digital signals of the radio waves received by the plurality of reception antennae, a spatial feature amount defined below, for each of the digital signals; and detecting, based on the calculated spatial feature amounts, a motion of a person outside the vehicle and a motion of a person intruding into the vehicle, wherein the spatial feature amount is an inner product of an eigenvector at reception of a digital signal during normal time and an eigenvector at reception of the digital signal during monitoring, the abnormality detection program further causing the computer to execute the step of determining, based on a detected motion of a person, whether or not the person is a suspicious person, only in a case where reception of a specific radio wave is not detected in the detection device for a vehicle.

* * * * *